United States Patent [19]
Iwanaga

[11] Patent Number: 5,385,761
[45] Date of Patent: Jan. 31, 1995

[54] DISCHARGE ELEMENT, METHOD OF PRODUCING THE SAME AND APPARATUS COMPRISING THE SAME

[75] Inventor: Masao Iwanaga, Tokyo, Japan
[73] Assignee: I.T.M. Corporation, Tokyo, Japan
[21] Appl. No.: 143,242
[22] Filed: Oct. 22, 1993

Related U.S. Application Data

[60] Continuation of Ser. No. 815,806, Dec. 30, 1991, abandoned, which is a division of Ser. No. 696,713, May 7, 1991, abandoned.

[51] Int. Cl.$^6$ ............... B05D 3/06; B05D 1/00; B05D 5/12
[52] U.S. Cl. .................. 427/448; 427/454; 427/540; 427/78
[58] Field of Search ............... 427/448, 453, 454, 455, 427/540, 446, 77, 78

[56] References Cited

U.S. PATENT DOCUMENTS

| | | | |
|---|---|---|---|
| 2,321,587 | 6/1943 | Davie et al. | 427/540 |
| 3,071,490 | 1/1963 | Pevar | 427/540 |
| 3,298,864 | 1/1967 | Maylandt | 427/78 |
| 3,788,968 | 1/1974 | Müller | 204/294 |
| 3,836,393 | 9/1974 | Ernsthausen et al. | 427/78 |
| 4,392,927 | 7/1983 | Fabian et al. | 427/453 |
| 4,404,234 | 9/1983 | Zuk | 427/540 |
| 4,407,849 | 10/1983 | Haas et al. | 427/540 |
| 4,412,377 | 11/1983 | Nagashima et al. | 427/34 |
| 4,461,799 | 7/1984 | Gavrilov et al. | 427/34 |
| 4,700,261 | 10/1987 | Nagase et al. | 250/326 |
| 4,709,298 | 11/1987 | Hosono et al. | 250/326 |
| 4,784,160 | 11/1988 | Szilagyi | 427/540 |
| 4,922,099 | 5/1990 | Masuda et al. | 250/324 |
| 4,975,579 | 12/1990 | Iwanaga | 250/324 |
| 5,066,513 | 11/1991 | Zurecki et al. | 427/34 |
| 5,272,414 | 12/1993 | Iwanaga | 313/631 |

FOREIGN PATENT DOCUMENTS 0178907  4/1986  European Pat. Off. ......... 250/326
62-274834 10/1987  Japan .

*Primary Examiner*—Marianne Padgett
*Attorney, Agent, or Firm*—Price, Heneveld, Cooper, DeWitt & Litton

[57] ABSTRACT

A discharge element comprises a linear electrode and a sheet electrode both of which are provided opposite to each other with an insulator sheet therebetween, in which the linear electrode is formed by plasma spray coating a high-meting point semiconductor so as not to be worn when a high-frequency high voltage is applied between both electrodes.

14 Claims, 8 Drawing Sheets

COOLING DEVICE

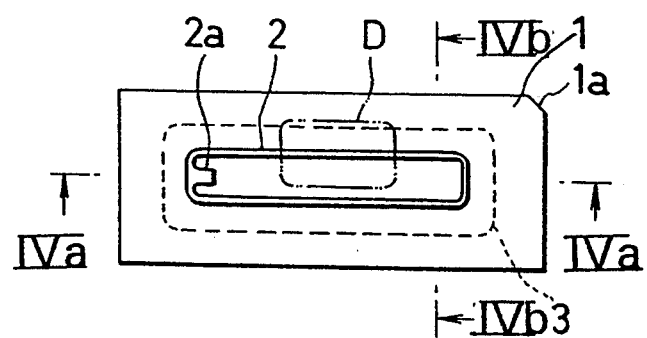
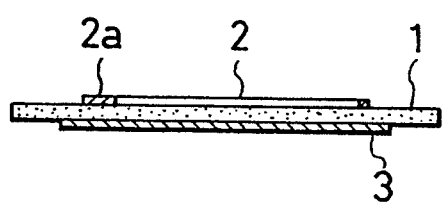 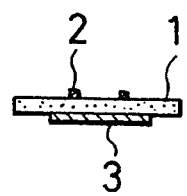
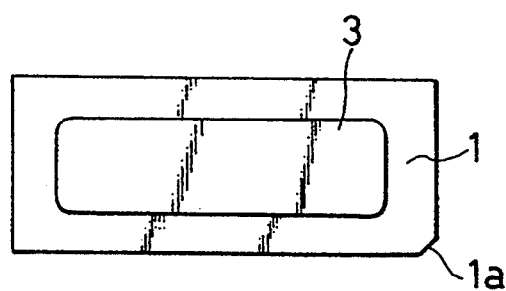

DISCHARGE ELEMENT, METHOD OF PRODUCING THE SAME AND APPARATUS COMPRISING THE SAME

This is a continuation of co-pending application Ser. No. 07/815,806 filed on Dec. 30, 1991 now abandon which is a division of application Ser. No. 07/696,713, filed May 7, 1991, now abandon in the name of Masao Iwanga for DISCHARGE ELEMENT, METHOD OF PRODUCING THE SAME AND APPARATUS COMPRISING THE SAME.

BACKGROUND OF THE INVENTION

The present invention relates to a discharge element used for producing ozone from air or oxygen, charging and destaticizing powder, charging and destaticizing photoconductive insulating films used in electronic copying machines, treating plastic surfaces and the like. The present invention also relates to a discharge apparatus comprising a combination of the discharge element with a power source for driving the element, a discharge treatment apparatus comprising a combination of the discharge element with an auxiliary device, a power source and a handling device and the like.

This type of conventional discharge element has a conductive linear electrode mainly composed of a metal and provided on the surface of a ceramic insulator and a sheet electrode provided therein. When a high-frequency silent creeping discharge is produced on the surface of the ceramic insulator by applying a high-frequency high voltage between both electrodes, the linear electrode becomes worn and irregularly deformed, or the linear electrode is partially melted, scatters and adheres to the surface of the ceramic insulator. This causes a disturbance in the electric field and a deterioration in the efficiency of the electrode serving as an ion source. Apart from the melting of the electrode, this phenomenon is sometimes caused by the oxide produced by oxidation of the surface of the electrode having a low melting point and the property of easily separating.

In order to solve the above-described problem, the surfaces of the linear electrode and the ceramic insulator are coated with melted glass glazing, a ceramic thin film or the like. However, a thin coating film cannot withstand use for a long time and a thick coating film causes difficulties in generating ions due to the insulating properties between coating films and brings about the need for application of a voltage higher than that applied in a case without any coating film. In the case of a glazing layer, fine particles are generated from the glazing layer during discharge because the melting point thereof is not so high. Thus the treated gas produced when a discharge element is employed for treating the gas is sometimes contaminated with the fine particles. The contamination has a significant effect on the quality of the product to which the treated gas is applied. Particularly, when ozone is produced from oxygen used as a raw material by using a discharge element provided with glazing in accordance with the prior art and is used for ashing semiconductor products, if alumina is used as a ceramic insulator for the discharge element, the gas containing the produced ozone is contaminated with oxygen inevitably contained in the glazing material. This sometimes has a significant adverse effect on the quality of a semiconductor product.

In addition, in the prior art, fine ceramic represented by alumina of 92% or more purity is used as an insulator and has a conductive linear electrode integrally formed on the surface thereof and a sheet electrode integrally formed therein. A method generally used for thick film multilayer printed ceramic substrates is employed for forming both electrodes in which both electrodes are printed by a thick film technique on the insulator in the form of a green sheet before burning, pressure-welded and then metallized by burning at a high temperature for a long time in a hydrogen atmosphere. In the discharge element produced by the above method, only paste containing as a main material, tungsten can be used as an electrode material because the thermal expansion coefficient of the alumina ceramic used as the insulator must agree with that of the electrode material within the wide temperature range from room temperature to about 1500° C. However, since tungsten is easily oxidized at a high temperature, the electrode is worn by the oxygen contained in the atmosphere in which the discharge element is used, and the efficiency cannot be stably maintained for a long time. In addition, in the above-described method of producing a discharge element, which method is generally used for thick film multilayer printed ceramic substrates, although semiconductor ceramic is used as an electrode material, since a semiconductor literally has a high electrical resistance, the efficiency deteriorates due to the generation of heat in the electrode which results a decrease in the applied voltage in a portion of the electrode away from a feeding portion, which is caused by the voltage drop of the electrode resistance even if only the material for the electrode structure is replaced by a semiconductor material. No electric field apparatus which can be brought into practical use can thus be obtained.

The above-described methods also have the critical disadvantage that the production cost is high because the production equipment is expensive, and the production of a discharge element requires much time.

Apart from the above prior art, the ozonizer electrode shown in FIGS. 20 and 21 comprises a rod electrode 42 formed on one surface of a dielectric substrate 41 with a spacer 44 for keeping a distance 1 therebetween and a sheet dielectric electrode 43 formed on the other surface, the rod electrode 42 being made of conductive ceramic having electric conductivity of $10^2 \Omega^{-1}$ cm$^{-1}$ or more at 20° C., the sheet dielectric electrode 43 being made of conductive ceramic or a metal, and an a.c. high-voltage power source 46 being connected between the rod electrode 42 and the sheet dielectric electrode 43. In this case, although a boron compound is suitable as a conductive ceramic material, a boron compound has a critical problem with respect to chemical contamination of a semiconductor which is caused when ozone is used for treating semiconductors is produced as described above. In addition, if the purity of the conductive ceramic is increased for obtaining high efficiency, the difference between the thermal expansion coefficients of the electrode and the substrate is increased. This mainly causes difficulties in fixing the positional relation between the dielectric substrate 41 and the rod electrode 42 and a problem with respect to the long-term stability of the electrode efficiency.

Accordingly, it is an object of the present invention to solve the above problems of conventional discharge elements. Namely, the object is to improve the durability of a conductive linear electrode so as to prevent the linear electrode from being worn, irregularly deformed, by locally scattering and adhering to the surface of a ceramic insulator when a high-frequency high voltage is applied between both electrodes. The means for improving the durability brings about an improvement in the efficiency of the whole electrode and a reduction in the production cost, without deteriorating the ability to generate ozone.

It is another object of the present invention to curtail the overall cost of an apparatus comprising a discharge element by reducing the number of steps required for actually incorporating the discharge element into the apparatus. For example, in the ozone generating element shown in FIGS. 17, 18a, 18b and 19, which is formed by employing the conventional technique of producing multilayer ceramic printed substrates, a glaze coating film 24 must be provided for preventing the wearing of the linear electrode 22 formed on a surface of an alumina substrate 21 and containing tungsten as a main component. In addition, it is necessary to pass a feeding portion 22a, or supplying electricity to the linear electrode 22, through a through hole 27, form a nickel layer for soldering on the surface the feeding portion 22a, place a solder layer 25 on the nickel layer and solder a feeder 26 to the solder layer In this case, the feeding portion 22a and the through hole 27 do not contribute to the generation of ozone but produce an increase in the cost caused by unnecessary increases in the sizes of the element and the container for receiving the element.

In addition, it is necessary for supplying electricity to a metal sheet electrode 23 containing tungsten as a main component to form a nickel layer 28 for soldering, place a solder layer 25 thereon and soldering a feeder 26 to the solder layer 25. The ozonizer electrode shown in FIGS. 20 and 21 also has such complicated structure and assembly and, particularly, they have a significant problem with respect to the need for a great cost for assembly including soldering. Further, when the element is sealed in a container having an inlet and an outlet and used, as in a general ozone generating apparatus, there is often the critical problem that the solder layer 25 is eroded by the ozone with the passage of time during use, and feeding finally becomes impossible.

It is a further object of the present invention to decrease the production cost of a discharge element by simplifying the method of producing the discharge element and to widen the applicability of the discharge element by widening the range of materials for the element which can be used according to the purposes of use.

SUMMARY OF THE INVENTION

The present invention provides a high-efficiency discharge element with high durability comprising an insulator sheet (referred to as "ceramic insulator" hereinafter) made of ceramic, glass, crystallized glass, enamel or the like, a sheet electrode provided on the rear side of the insulator sheet, and a high-melting point semiconductor linear electrode formed on the surface opposite to the sheet electrode by flame spray coating. The present invention also provides a method of producing a discharge element comprising providing a masking member on the surface of a ceramic insulator sheet by screen printing so that the masking member adheres to the surface, forming at least one of a high-melting point semiconductor linear electrode and a sheet electrode by flame spray coating and then removing the masking member. The present invention further provides a silent discharge generating apparatus comprising the discharge element in which, when an a.c. high voltage is applied between the sheet electrode and the linear electrode, which are provided with the ceramic insulator sheet therebetween, uniform silent discharge is generated around the linear electrode.

In the discharge element of the present invention, when an a.c. high voltage from an a.c. high voltage source is applied between the sheet electrode provided on the rear side of the ceramic insulator sheet and the high-melting point semiconductor linear electrode provided on the surface opposite to the sheet electrode, and a.c. silent creeping discharge is generated around the linear electrode centered on the surface of the ceramic insulator sheet on the linear electrode side between both electrodes. The discharge element is thus used for electrically charging articles such as powder, films and the like by extracting a large amount of unipolar ions from the discharge region, destaticizing articles by alternately extracting a large amount of positive and negative ions, modifying the surfaces of articles and powder by treating them in the discharge region, or effecting chemical reaction, e.g., ozonization of oxygen, by employing a gas reaction in the discharge region.

In these cases of use, since the linear electrode at the center of a high frequency silent creeping discharge is subjected to collisions with ions and electrons in a strong electrical field, the surface of the electrode is locally heated to a high temperature, and a difference in temperature thus occurs between the linear electrode and the ceramic insulator sheet. However, because the ceramic insulator sheet is made of a material such as alumina or the like which has good thermal conductivity, and because the linear electrode is formed by flame spray coating a high-melting point conductive ceramic material such as TiN, TaN or the like, which is chemically stable, on the insulator sheet so as to have a width of 1 to 0.25 mm, a thickness of about 0.01 to 1 mm, in a rectangular sectional form and a structure in which the long side of the sectional form adheres to the ceramic insulator sheet, the electrode sufficiently cooled. Further, since the electrode is formed by flame spray coating, the electrode is made of a semiconductor having porosity of 2.5 to 12.5%. Because the linear electrode thus has resistance to sudden changes in temperature with position and time, it is not worn. Although the specific resistance value of the high-melting point semiconductor linear electrode is about $10^{-3}$ to $10^{-1}$ $\Omega$cm, the purposes of use can be satisfactorily achieved by appropriately forming and connecting the electrode, as described below. It is said that., in the case of a high-frequency creeping discharge electrode as in the present invention, sufficient efficiency cannot be obtained unless the specific resistance is $10^{-3}$ $\Omega$cm or less. This applies to the case of a rod electrode sintered together with additives. In this case, the process of sintering the rod electrode requires much time for operating the sintering apparatus used, thereby increasing the cost, and the rod electrode is insufficiently cooled due to the poor adhesion of the rod electrode to a dielectric substrate. This causes an increase in the temperature of the electrode and acceleration of decomposition by ozone, as well as the problem that a difference in thermal expansion between both materials causes difficulties in fixing the relative position between the dielectric substrate and the rod electrode and in feeding. As described above, the present invention is capable of solving the above problem.

In the discharge element of the present invention, the linear electrode can be formed on the ceramic insulator sheet so as to adhere thereto by only a simple process such as flame spray coating for a short time. The discharge element thus has many advantages to practical use that many elements can be produced at low cost, and that the sizes of the element and an apparatus comprising the element and the production cost can be reduced because there is no need for soldering for feeding and mounting and the processing related to the soldering.

BRIEF DESCRIPTION OF THE DRAWINGS

FIG. 3 is a plan view of the discharge element as a component of the apparatus shown in FIG. 1;

FIG. 4a is a sectional view taken along the line A—A in FIG. 3;

FIG. 4b is a sectional view taken along the line C—C in FIG. 3;

FIG. 5 is a bottom view of the discharge element shown in FIG. 3;

FIG. 35 is a longitudinal sectional view of another apparatus to which the present invention is applied;

DETAILED DESCRIPTION OF THE INVENTION

Figure 1:
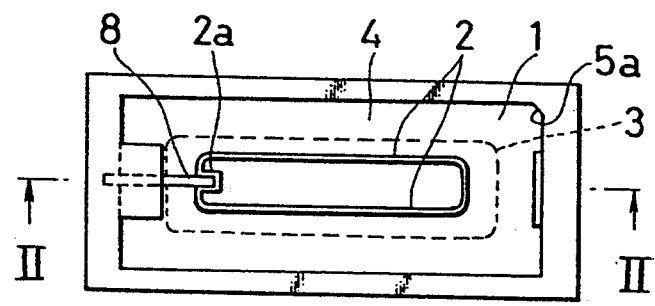
FIG. 1 is a plan view of an ozone generating apparatus comprising a discharge element of the present invention which is also a plan view of a portion including the line B—B in FIG. 2.
Figure 2:
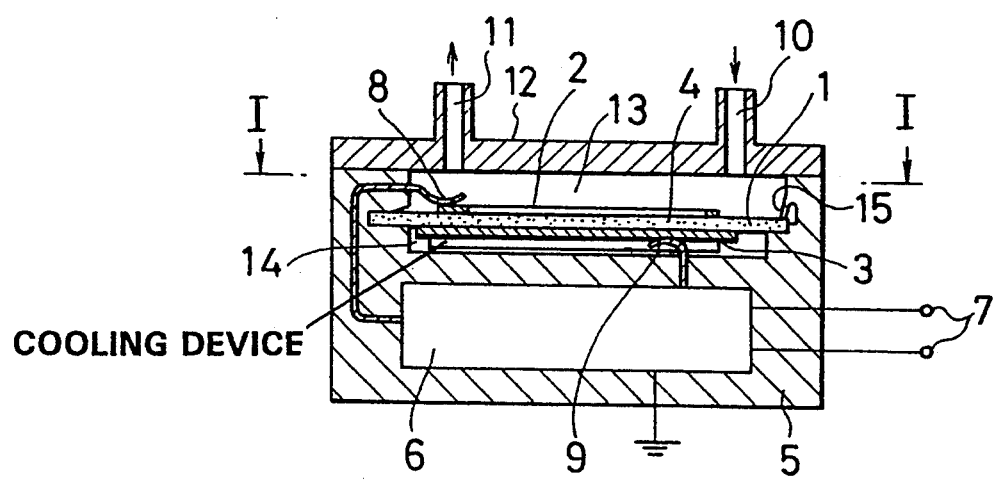
FIG. 2 is a sectional view taken along the line A—A in FIG. 1.

FIGS. 1 and 2 show an ozone generating apparatus comprising a discharge element of the present invention, and FIGS. 3 to 5 show the discharge element as a component of an apparatus.

In FIGS. 3, 4 and 5, a conductor (for example, stainless ceramic conductor or semiconductor) sheet electrode 3 is caused to adhere to the rear side of a ceramic insulator sheet (referred to as "sheet" hereinafter) 1, and a ceramic semiconductor linear electrode 2 is provided in a rectangular form on a portion of the front side of the sheet inwardly of the portion opposite to the sheet electrode 3, a portion of the linear electrode 2 being widened so as to serve as a linear electrode feeding portion 2a. Although an alumina substrate having good thermal conductivity, purity of 90% or more and a thickness of 0.2 to 1 mm is generally used as the sheet 1, an aluminum nitride and other ceramic insulator sheets and the like may be used as occasions demand.

The ceramic semiconductor electrode 2 is formed by a process of flame spray coating, such as plasma spray coating a high-melting point ceramic conductive material such as TiN, TaN or the like so as to generally have porosity of 2.5 to 12.5% and to adhere the coating to the sheet 1, through a mask corresponding to the shape of the electrode. When a discharge element 4 is used in an ozone generating apparatus, as shown in FIGS. 1 and 2, the element is fixed in an upper space of the apparatus body 5 having an a.c. high voltage source 6 by an element holding spring 15. In this case, one of the a.c. output terminals of the power source 6 is welded to the sheet electrode 3 of the discharge element 4 through a sheet electrode feeding piece 9 made of a spring material having resistance to ozone so as to supply electricity to the sheet electrode 3. The other a.c. output terminal is welded to the linear electrode feeding portion 2a through a linear electrode feeding piece 8 made of a spring material having resistance to zone and having a contact portion smaller than the linear electrode feeding portion 2a so as to supply electricity to the linear electrode 2. This structure permits a silent discharge to be generated over a width of 2 to 10 times the thickness of the insulator sheet at both sides of the linear electrode 2. If air or oxygen is supplied to the front space 13 through an air inlet 10 of a cover 12 placed on the body 15, gas containing ozone can be obtained from the outlet 11. In the drawings, reference numeral 7 denotes power source input terminals for the a.c. high voltage source 6, which terminals are unnecessary when a battery is used as a power source. When the discharge element 4 is small, the rear space thereof may be simply a space, while when the discharge element 4 is large and consumes much electricity, it is sometimes necessary to provide a cooling device for cooling the element on most of the rear side of the element 4 as illustrated in FIG. 2.

Figure 11:
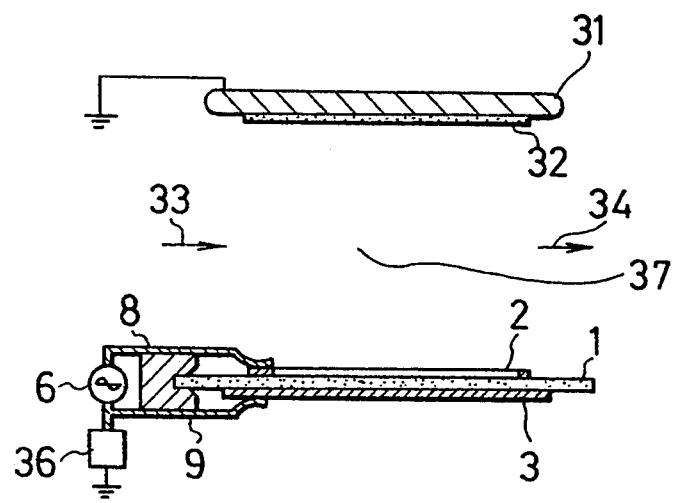
FIG. 11 is a longitudinal sectional view of an ion generating apparatus to which the discharge element of the present invention is applied.
Figure 12:
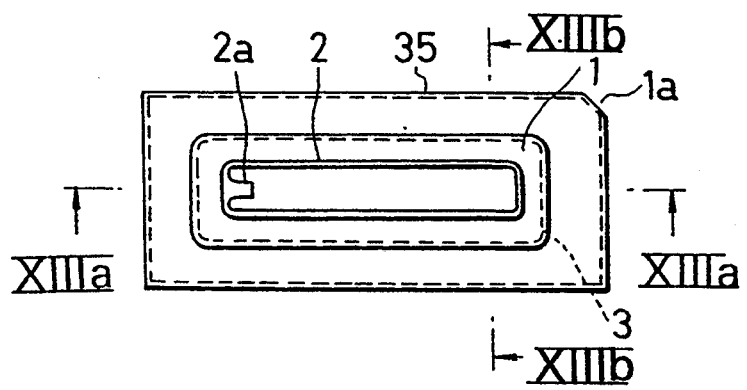
FIG. 12 is a plan view of a portion of the apparatus shown in FIG. 11.
Figure 13A:
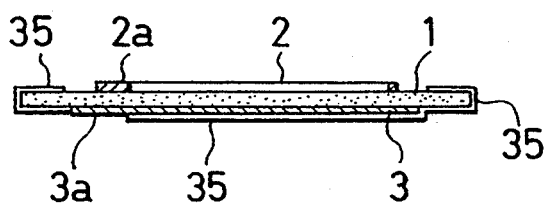
FIG. 13a is a sectional view taken along the line A—A in FIG. 12.
Figure 13B:
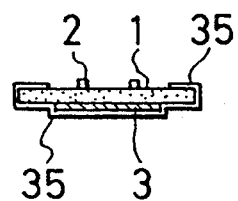
FIG. 13b is a sectional view taken along the like C—C in FIG. 12.
Figure 14:
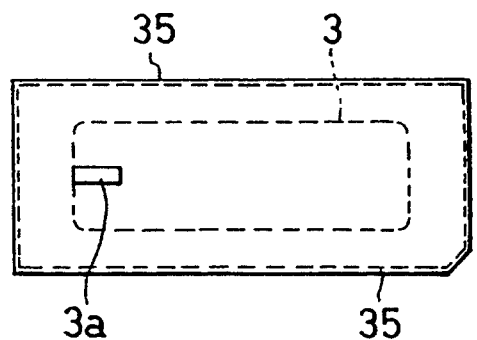
FIG. 14 is a view of the rear side of the portion shown in FIG. 12.
Figure 17:
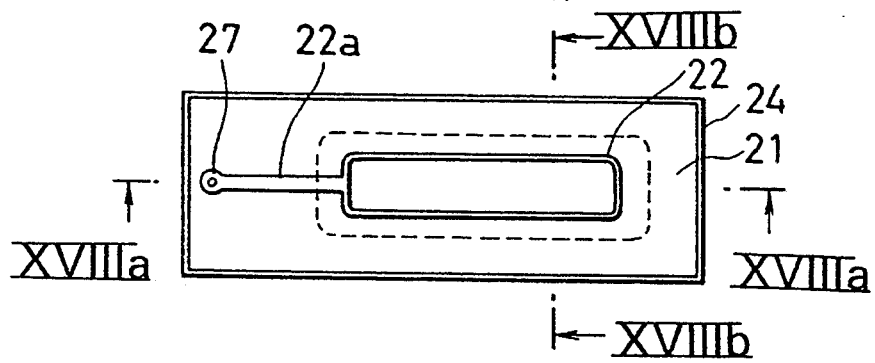
FIG. 17 is a plan view of a conventional discharge element.
Figure 18A:
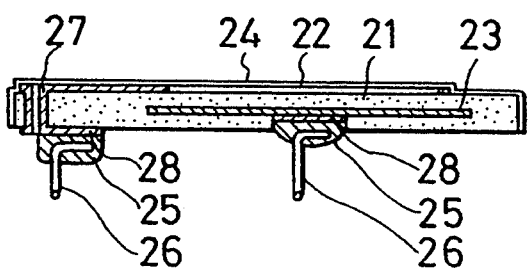
FIG. 18a is a sectional view taken along the line P—P in FIG. 17.
Figure 18B:
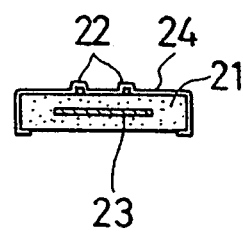
FIG. 18b is a sectional view taken along the line Q—Q in FIG. 17.
Figure 19:
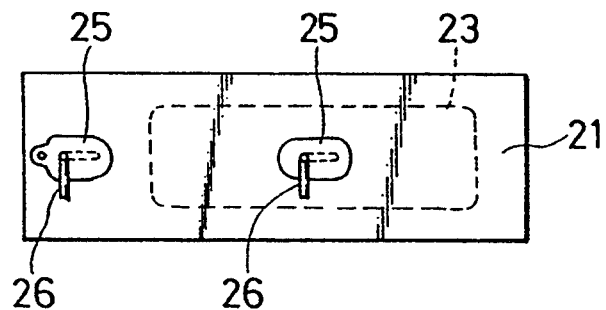
FIG. 19 is a view of the rear side of the discharge element shown in FIG. 17.
Figure 20:
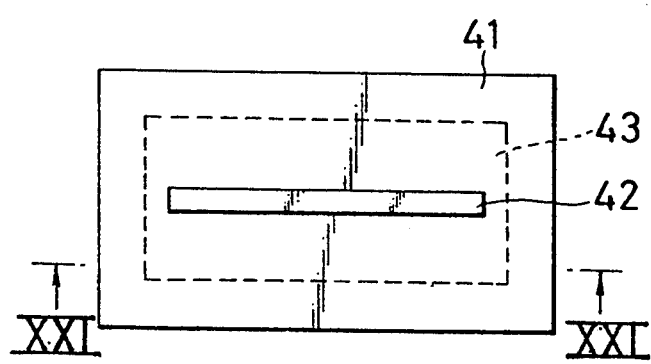
FIG. 20 is a plan view of another conventional discharge element.
Figure 21:
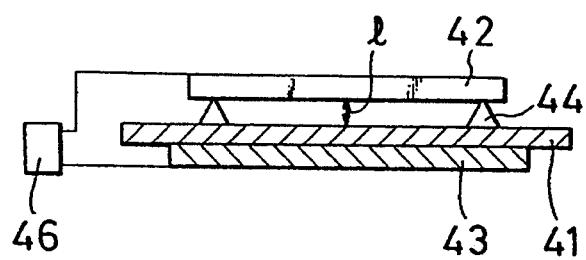
FIG. 21 is a sectional view taken along the line A—A in FIG. 20.

In the case of the ozone generating apparatus shown in FIGS. 1 and 2, since no discharge is generated on the side of the sheet electrode 3 of the discharge element 4, the sheet electrode 3 and the feeding piece 8 may be made of a ozone-resistant conductive material such as stainless steel or the like. However, when it is desired to prevent curvature of the sheet electrode 3, the sheet electrode 3 may be formed by plasma spray coating a ceramic conductive material such as TiN, TaN or the like having thermal conductivity which is substantially equal to that of the sheet 1. A projecting portion 5a, on the inside of the body 5, and a notch 1a of the ceramic insulator sheet 1, of the discharge element 4, form a device for preventing wrong assembly which is provided for preventing the discharge element 4 from being mistakenly set upside down during assembly or maintenance service. In the case of the discharge element 4 of the present invention, although the sheet electrode 3 is sometimes buried in an insulating material, except the feeding portion thereof, as shown in FIGS. 17, 18 and 19, the sheet electrode is not limited to this. As shown in FIGS. 3, 4 and 5, the sheet electrode 3 may be exposed to air so that the shortest distance between the linear electrode 2 and the sheet electrode 3 is sufficiently larger than the creeping discharge resistant distance of the insulator sheet 1. In this case, it is important to round the outer shape of the linear electrode 2 and the sheet electrode 3 for obtaining as high a creeping discharge resistant voltage as possible between the linear electrode 2 and the sheet electrode 3. In another case, a silicone resin is injected into the rear space 14 shown FIG. 2 so that the sheet electrode 3 is buried therein. In a further case, as shown in FIGS. 11, 12 and 13, a repellent coating 35 is provided on a portion on the linear electrode side of the sheet 1 corresponding to the sheet electrode 3 and the portion of the sheet electrode 3 excluding the feeding portion 3a so as to effectively prevent the dielectric breakdown of the discharge element 4 from being produced by moisture when air and the like is used as a raw material gas. This is an important feature of the present invention. In addition, when air is used as raw material gas for producing ozone, water sometimes adheres to the insulator surface after the operation has been stopped, and thus the apparatus cannot be easily started due to an increase in electric capacity between the linear electrode 2 and the sheet electrode 3. In order prevent this phenomenon, the amount of water adhering can be decreased by using an alumina substrate (purity, 99% more) having a smooth surface or alumina substrate (purity 95% or more) in which at least the portion for generating discharge is polished. This is also an important feature of the present invention.

A fundamental important feature of the present invention lies the method of producing many discharge elements of high efficiency at low cost by closely combining the insulator sheet 1 and the semiconductor linear electrode 2 by flame spray coating, as described above. The production method is described in detail below.

Figure 6:
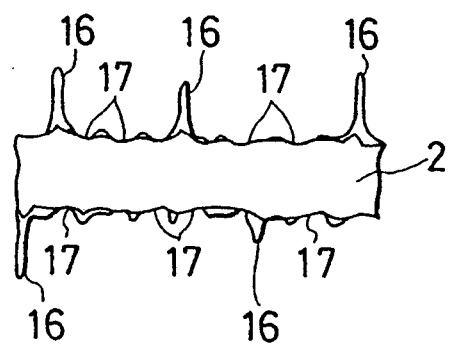
FIG. 6 is an enlarged view of a portion D surrounded by the two-dot chain line in FIG. 3.
Figure 7:
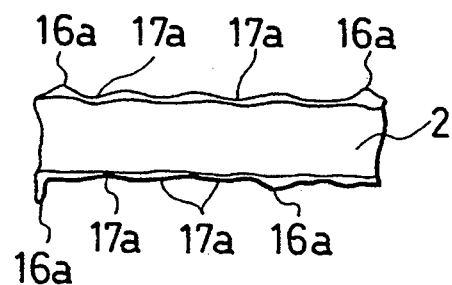
FIG. 7 is a plan view of the portion shown in FIG. 6 in another state.
Figure 8:
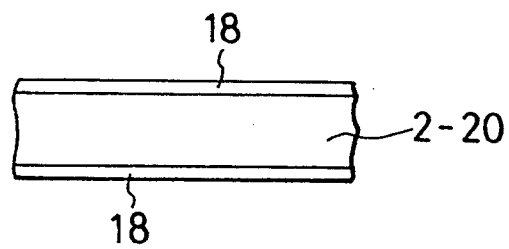
FIG. 8 is a plan view of the same portion in still another state.
Figure 9:
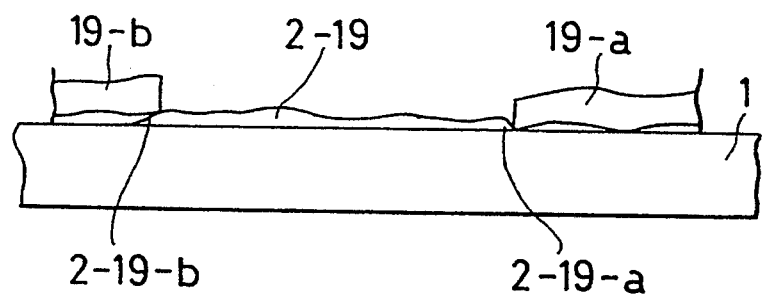
FIG. 9 is an enlarged sectional view of a linear electrode and a portion near the electrode in a conventional method of producing a discharge element.
Figure 10:
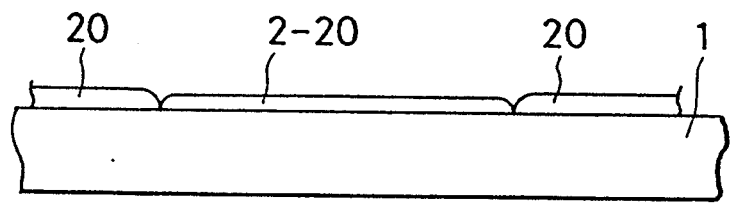
FIG. 10 is an enlarged sectional view of the same portion as that shown in FIG. 9 in a production method of the present invention.

FIGS. 6, 7 and 8 are enlarged views of the portion near the linear electrode 2, shown in FIG. 3, of the discharge element of the present invention under operation. FIG. 6 shows a case where high efficiency is not obtained, FIG. 7 shows a case where no substantially satisfactory efficiency is obtained, and FIG. 8 shows a case where ideal high efficiency is obtained. In FIG. 6, the linear electrode 2 has a shape in which projections and recesses are alternately irregularly range at the edge thereof, a strong discharge portion 16 strongly emitting light being produced at each of the projecting portions, and a non-discharge portion 17 being present in each of the recesses. Thus, the ozone produced in the strong discharge portions 16 is decomposed due to the high temperature thereof, and no ozone is generated in the recesses, thereby decreasing the overall efficiency of generation of ozone. As a result, a sufficiently high efficiency cannot be exhibited. The cause of this phenomenon is explained by the enlarged sectional view taken along the line vertical to the linear electrode during production in FIG. 9. In FIG. 9, the linear electrode material which is melted by flame spray coating scatters and enters a portion under the masking metal plate 19-b where the masking metal plate 19-b insufficiently adhere to the sheet 1 to form a projecting portion 2-19-b in the linear electrode. Conversely, a recess 2-19-a is formed in the linear electrode 2-19 in a portion where the masking metal plate 19-a sufficiently adheres to the sheet 1. As a result, projections and recesses irregularly range at the edge of the linear electrode 2, as shown in FIG. 6 Since, in such a phenomenon, the projections and recesses at the edge of the electrode are of a micron size, they cannot be effectively removed in many cases by employing a method of causing the masking metal plate made of a magnetic material to adhere to the sheet 1 using a strong magnet on the rear side thereof. FIG. 10 shows the feature of the method of producing a high-efficiency discharge element in accordance with the present invention which is capable of solving the problem. FIG. 10 is an enlarged sectional view taken along the line vertical to the linear electrode during the production of the electrode. In FIG. 10, a masking member 20 mainly composed of a heat-resistant resin is formed on the sheet 1 by screen printing so as to adhere thereto and, if required, can be subjected to a dry-baking process. A linear electrode 2-20 is then formed by flame spray coating. This method prevents the linear electrode material from entering under the masking member 20 and thus enables the formation of the linear electrode having no irregularity at the edge therefrom, as shown FIG. 8. It is therefore possible to generate uniform discharge 18 during operation and obtain high efficiency of the generation of ozone. The above-described feature that uniform discharge is generated near the linear electrode is a very important feature of a general discharge element comprising a sheet electrode and a linear electrode with a ceramic insulator sheet therebetween and used for generating ozone or extracting ions.

After the linear electrode has been produced, the masking member 20 can be removed by sandblasting or scraping by a wire brush. Although the material for the masking member 20 depends upon the material required for the electrode and production speed thereof, the masking member 20 is preferably mainly made of a resin material having resistance to heat at 150° C. or more and adhesion to the sheet 1 which is not excessively high. Examples of such materials include epoxy-modified polyparabanic acid, silicone resins, fluorine resins and the like. In the production method characterized by adhesion of the masking member 20 to the sheet 1, the removal of the masking member 20 after the linear electrode is formed is also an important process, and the above-described dry process is preferred. From this viewpoint, the masking member 20 preferably has adhesion to the sheet 1 which is not excessively high. Although a general resist agent used for processing printed substrates can be used as the masking member 20 so that the electrode can be formed By flame spray coating after the electrode portion of the masking member has been removed by photosensitive treatment, the method often costs much. An aqueous material can be used as a main component of the masking member, and, in some cases, the material can be used in an uncured form. In this case, since the masking member can be removed simply by water washing, the cost is sometimes reduced. In order to prevent a decrease in the efficiency of the element which is caused by the nonuniform discharge produced due to the projections formed at the edge shown in FIG. 6, the discharge state shown in FIG. 6 can be improved to the state having the discharge portion 16a and the non-discharge portion 17 shown in FIG. 7 or the state having the uniform discharge portion 18 shown in FIG. 8 by applying to the element a voltage of 1 to 1.5 times the a usual applied voltage for aging the element for about 1 to 10 hours. When an apparatus comprising the discharge element in accordance with the present invention is used for processing a semiconductor, the material for the linear electrode of the element is preferably a high-melting point ceramic conductive material such as TiN, TaN or the like. When the apparatus is used Cot other purposes, borides and carbide of the transition metals in Groups IVa, Va in the Periodic Table can be used.

FIG. 11 shows a basic arrangement of the present invention concerning a system for utilizing the discharge element in an ion generating apparatus, a charging apparatus, a destaticizing apparatus or the like.

In FIG. 11, an a.c. silent creeping discharge having a certain relation to the frequency of the a.c. power source 6 is generated on the surface of the discharge element on the linear electrode side, and plasma containing positive and negative ions and electrons is periodically generated. For example, if a potential setting power source 36 is interposed between the discharge element and the earth, and if an earthed counter electrode 31 is provided opposite to the discharge element, an electrical field is generated between the discharge element and the counter electrode depending upon the polarity and voltage of the potential setting power source 36, so that ions with a specified polarity are extracted from the plasma and fly through the space 37 toward the counter electrode 31. For example, if a negative d.c. power source is used as the potential setting power source 36, negative ions are extracted from the discharge element, while if a positive power source is used, positive ions are extracted. If an a.c. power source is used, positive and negative ions are alternatively extracted toward the space 37. In this case, the frequency of the power source 36 must be lower than that of the power source 6, as a general rule. In this way, the ion generating apparatus in accordance with the present invention shown in FIG. 11 allows the amount of ions generated to be adjusted over a wide range by controlling the power source 6. The ion generating apparatus also has the remarkable characteristic that the field strength of the space where ions are present and the polarity of ions can be freely selected independently of the amount of ions generated. The characteristics described in detail above with reference to FIGS. 1 to 14 enable the apparatus to secure a long life and a wide operating range when being put into practical use. The ion generating apparatus shown in FIG. 11 can be used as a charging apparatus when a d.c. power source having a desired polarity is used as the potential setting power source 36, and when powder or granules are passed through the space 37 at a high speed as shown by arrows 33, 34 in FIG. 11, so that the power or granules can be charged with a desired polarity. Similarly, when an a.c. power source is used as the potential setting power source 36, and when an article is passed through as shown by the arrows 33, 34 so that the article can be exposed to many negative and positive ions, the apparatus can be used as a high-efficiency destaticizing apparatus. In addition, when a solid or liquid particles are slowly passed through the space 37, the functions of both the charge and the Coulomb's force enable the apparatus to be used as a high-efficiency electrical dust-collecting apparatus or an electrostatic coating apparatus. In this case, reference numeral 31 denotes a dust-collecting electrode or an article to be coated, and reference numeral 32 denotes collected dust or a coated layer. Further, when the counter electrode 31 serves as a conductive base for an electronic copying machine, and when reference numeral 32 denotes a high-resistance photosemiconductor layer formed on the counter electrode 31, the apparatus can be used as an apparatus for charging a semiconductor layer, a transfer charging apparatus or a destaticizing apparatus. In this case, the present invention has marked advantages with respect to speeding up of an electronic copying machine, softening of gradation, increasing the service cycle period and the like. The shape of the conductive base of an electronic copying machine is not limited to a plane, and a cylindrical shape and other shapes can be used as occasion demands. When the ion generating apparatus of the present invention is applied to a charging apparatus where that fine particles are present the ion generating apparatus has the significant characteristic that the particle repulsing effect of the nonuniform electrical field formed between the linear electrode 2 and the sheet electrode 3 fundamentally prevents the particles from collecting and adhering to the electrodes. This effect is a significant feature of the present invention shown in FIGS. 1 to 14.

Figure 15:
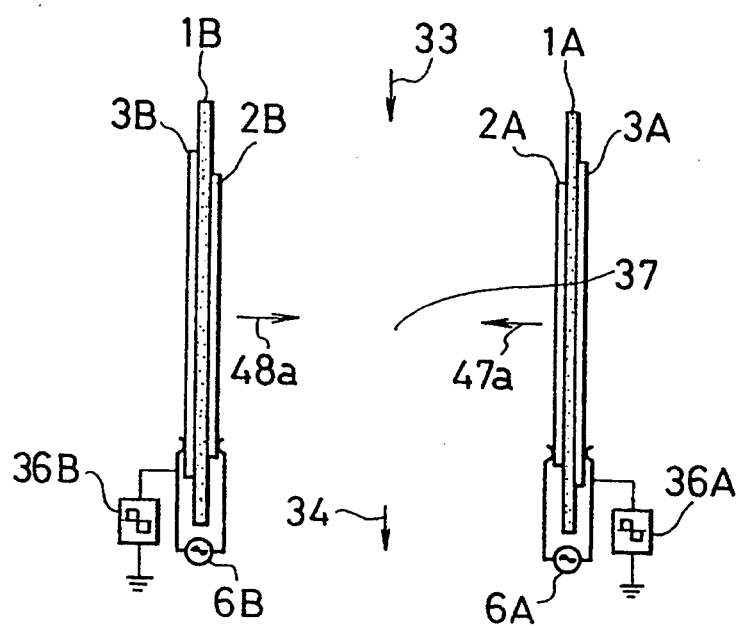
Figure 16:
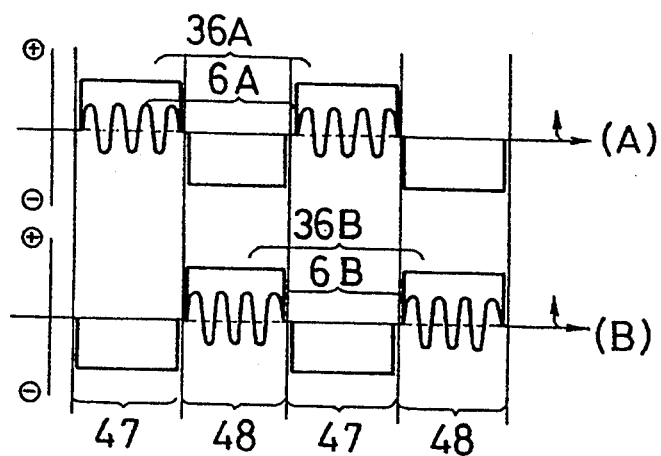
FIG. 16 is a line view showing the operating state of the apparatus shown in FIG. 15.

FIG. 15 shows an apparatus according to an embodiment of the present invention in which an article can be electrically charged or destaticized symmetrically from both sides thereof. In FIG. 15, if power sources 6A, 36A, 6B, 36B are operated with the time relation shown by FIG. 16, ions are extracted from an electrode 2A in the direction of arrow 47a in half cycle 47, and ions are extracted from electrode 2B in the direction of arrow 48a in half cycle 48. The ions extracted in all half cycles have a positive polarity so that the article passed through space 37 in the direction of arrows 33, 34 can be charged with ions with the same polarity from both sides. In addition, since the average potential of both elements is constantly zero, the article is not attracted to one of the elements by the Coulomb's force, and particularly high efficiency is exhibited when a high-resistance article is charged. When it is desired to obtain a negative charge, the relative relation between the power sources 36A, 6A and 36B, 6B may be shifted by a half cycle. Since positive and negative ions are alternately extracted from both discharge elements in each half cycle, the apparatus can be used as strong destaticizing apparatus.

AS described above, the present invention comprises a ceramic insulator sheet and a high-melting point semiconductor linear electrode, having relatively low electric resistance, provided on the sheet so as to adhere thereto. When discharge is produced from the linear electrode surface toward the sheet electrode, the linear electrode is slightly worn due to the great heat generated by ion corrosion, even though the temperature in the linear electrode is increased because the electrode is made of a high-melting point ceramic semiconductor. In addition, since the linear electrode is not melted and does not scatter and adhere to the surface of the ceramic insulator, no disturbance occurs in the discharge, and uniform discharge is thus generated over the whole surface. It is therefore possible to generate sufficient discharge at a relatively low voltage and easily handle the discharge element with a simple structure.

Further, since the linear electrode is produced by flame spray coating through a masking formed by screen printing and adhering to the sheet and, if required, subjected to aging, the linear electrode has no irregularity, and extremely uniform creeping discharge is performed by an a.c. high voltage. When the discharge element is used in an ozone generating apparatus, therefore, a highly efficient ozone generator is be obtained. When the element is used in a charging apparatus, a charging effect with good uniformity can be obtained. In addition, the masking member can be easily removed from the electrode, and many elements can be produced at low cost in a short time.

Since a silent discharge generating apparatus in accordance with the present invention has an electrode portion which is made of an ozone-resistant material generating no discharge in some operating, and which connected to a feeding piece made of an ozone-resistant material, it is easy to produce, maintenance and assemble the element and apparatus.

What is claimed is:

1. A method of producing a discharge element responsive to an operating voltage for generating a uniform silent creeping discharge on a surface of an insulator sheet along edges of a semiconductor linear electrode, the discharge element including a ceramic insulator sheet, the method comprising the steps of:

forming a masking member for defining a shape of the semiconductor linear electrode on the ceramic insulator sheet;

adhering said masking member to the surface of the ceramic insulator sheet by screen printing;

forming the semiconductor linear electrode on the ceramic insulator sheet by applying a coating including a ceramic conductive material selected from the group consisting essentially of TiN and TaN by plasma or flame spray on the insulator sheet and the masking member; and applying a,n aging voltage between the semiconductor linear electrode and the sheet electrode which is greater than the operating voltage for about 1 to 1.0 hours to remove projections and recesses arranged irregularly at the edge of the semiconductor linear electrode whereby the semiconductor linear electrode is aged.

2. A method of producing a discharge element according to claim 1 including the additional step of removing the masking member from the ceramic insulator sheet by sand blasting or brushing.

3. The method of producing a discharge element according to claim 1, further comprising the step of forming the masking member with a material having resistance to heat at a temperature of 150° C. or more.

4. A method of producing a discharge element as defined in claim 2 wherein the additional step of removing the masking member is by means of scraping including sandblasting.

5. The method of producing a discharge element as defined in claim 2 wherein the additional step of removing the masking member is by means of scraping including wire brushing.

6. A method of producing a discharge element for generating an even discharge when an operating voltage for generating a silent creeping discharge is applied thereto, comprising the steps of:

forming a discharge element including a ceramic insulator sheet sandwiched between a sheet electrode and a semiconductor linear electrode; and removing projections and recesses along an edge of the semiconductor linear electrode by applying an aging voltage greater than the operating voltage for generating the silent creeping discharge across the sheet electrode and the semiconductor linear electrode for about 1 to 10 hours thereby aging the semiconductor linear electrode.

7. A method of producing a discharge element responsive to an operating voltage for generating a uniform silent creeping discharge on a surface of an insulator sheet along edges of a semiconductor linear electrode, the discharge element including a ceramic insulator sheet, the method comprising the steps of:

forming a masking member for defining a shape of the semiconductor linear electrode on the ceramic insulator sheet;

forming the semiconductor linear electrode on the ceramic insulator sheet by applying a coating including a ceramic conductive material selected from the group consisting of TiN and TaN by plasma or flame spray on the insulator sheet and the masking member;

removing the masking member; and applying an aging voltage between the semiconductor linear electrode and the sheet electrode which is greater than the operating voltage for about 1 to 10 hours to remove irregular projections and recesses at the edge of the semiconductor linear electrode whereby the semiconductor linear electrode is aged.

8. A method of producing a discharge element according to Claim 7 including the additional step of removing the masking member from the ceramic insulator sheet by sand blasting or brushing.

9. The method of producing a discharge element according to claim 7, further comprising the step of forming the masking member with a material having resistance to heat at a temperature of 150° C. or more.

10. A method of producing a discharge element responsive to an operating voltage for generating a uniform silent creeping discharge on a surface of an insulator sheet along edges of a semiconductor linear electrode, the discharge element including a ceramic insulator sheet, the method comprising the steps of:

forming a masking member for defining a shape of the semiconductor linear electrode on the ceramic insulator sheet;

adhering said masking member to the surface of the ceramic insulator sheet;

forming the semiconductor linear electrode on the ceramic insulator sheet by applying a coating including a ceramic conductive material selected from the group consisting essentially of TiN and TaN by plasma or flame spray on the insulator sheet and the masking member;

removing the masking member; and applying an aging voltage between the semiconductor linear electrode and the sheet electrode which is greater than or equal to the operating voltage for about 1 to 10 hours to remove projections and recesses along the edge of the semiconductor linear electrode whereby the semiconductor linear electrode is aged.

11. A method of producing a discharge element according to claim 10 including the additional step of removing the masking member from the ceramic insulator sheet by sand blasting or brushing.

12. The method of producing a discharge element according to claim 11, further comprising the step of forming the masking member with a material having resistance to heat at a temperature of 150° C. or more.

13. A method of producing a discharge element as defined in claim 11, wherein the additional step of removing the masking member is by means of scraping including sandblasting.

14. The method of producing a discharge element as defined in claim 11, wherein the additional step of removing the masking member is by means of scraping including wire brushing.

* * * * *

UNITED STATES PATENT AND TRADEMARK OFFICE
CERTIFICATE OF CORRECTION

PATENT NO. : 5,385,761
DATED : January 31, 1995
INVENTOR(S) : Iwanaga

It is certified that error appears in the above-indentified patent and that said Letters Patent is hereby corrected as shown below:

Col. 11, line 42, Claim 10;

"a,n" should be --an--.

Col. 13, line 4, Claim 12;

"according to claim 11" should be --according to claim 10--.

Signed and Sealed this

Eleventh Day of July, 1995

BRUCE LEHMAN

Attest:

Attesting Officer        Commissioner of Patents and Trademarks